United States Patent [19]
Thomas

[11] Patent Number: 5,733,841
[45] Date of Patent: Mar. 31, 1998

[54] EUTECTIC DRYING COMPOSITION AND METHOD

[75] Inventor: Todd R. Thomas, Wexford, Pa.

[73] Assignee: Clearwater, Inc., Pittsburgh, Pa.

[21] Appl. No.: 768,793

[22] Filed: Dec. 18, 1996

Related U.S. Application Data

[63] Continuation of Ser. No. 515,147, Aug. 15, 1995, abandoned.

[51] Int. Cl.$^6$ .............. B01J 20/00; C09K 3/00; F26B 3/00
[52] U.S. Cl. .............. 502/400; 252/194; 34/333; 34/345; 34/DIG. 1
[58] Field of Search .............. 252/194; 502/400; 34/333, 345, DIG. 1

[56] References Cited

U.S. PATENT DOCUMENTS

| | | | |
|---|---|---|---|
| 2,143,008 | 1/1939 | Heath et al. | 252/2.5 |
| 2,988,509 | 6/1961 | Schilberg | 252/70 |
| 3,334,468 | 8/1967 | Wilcox | 95/91 |
| 3,390,511 | 7/1968 | Norton | 55/35 |
| 3,779,936 | 12/1973 | Pearce et al. | 252/194 |
| 3,885,926 | 5/1975 | Manning et al. | 55/29 |

Primary Examiner—Glenn Caldarola
Assistant Examiner—In Suk Bullock
Attorney, Agent, or Firm—William L. Krayer

[57] ABSTRACT

Solid gas-drying forms are made by heating drying salts with a polar solvent to form a saturated solution, then cooling, freezing and forming. Preferred salts are combinations of calcium and lithium bromides and chlorides in particularly effective molar ratios.

13 Claims, 3 Drawing Sheets

5,733,841

EUTECTIC DRYING COMPOSITION AND METHOD

This is a continuation of application Ser. No. 08/515,147, filed on Aug. 15, 1995, now abandoned

TECHNICAL FIELD

This invention relates to compositions and methods for drying methane and natural gas. Particular solid compositions and methods of making them in solid form are used in natural gas processing systems and for compressed gas to be dried for use as automotive fuel.

BACKGROUND OF THE INVENTION

Natural gas contains small amounts of moisture which should be removed for transmission through pipelines. Moisture specifications for gas which is to be used in fueling automotive fleets are generally more difficult to meet than those for gas transmission lines. Drying of natural gas and methane continues to be a problem for these purposes and others, and it appears that stringent demands will continue to be placed on suppliers of drying materials and devices.

Both solid and liquid dehumidifying, hygroscopic and dessicant materials have long been known and studied. One of the more succinct disclosures of combinations of drying salts appears in U.S. Pat. No. 2,143,008 to Heath and Minger. The inventors calculated and drew vapor pressure isobars on a chart representing ratios of concentrations in solution of calcium chloride, calcium bromide, lithium bromide, and lithium chloride, thus showing the drying efficacy of certain combinations of these materials. They used the combinations in aqueous solutions, and studied the effects of diluting them on their vapor pressures at various temperatures. Because the variable vapor pressures of these combinations of salts are analogous to the melting temperatures of classical eutectic compositions, I refer to them herein as "eutectic" drying compositions.

Liquid drying agents comprising calcium chloride are also disclosed by Manning et al in U.S. Pat. No. 3,885,926; the solutions are used for drying gaseous petroleum hydrocarbons.

Schilberg, in U.S. Pat. No. 2,988,509 combined sodium chloride and calcium chloride in certain ratios to a "plastic" consistency, formed particles, and dried them to concentrations of water less than 6 percent. Pellets are made by Norton in U.S. Pat. No. 3,390,511, using compositions which may also include certain sugars. Small briquettes and pellets have been used widely in the art, but frequently they suffer from physical weaknesses which contribute to failures of the drying systems.

In U.S. Pat. No. 3,779,936, Pearce et al relate that the addition of polyethylene glycol in amounts from 0.1% to 10% in compositions comprising calcium chloride will provide briquettes having greater strength and resistance to attrition than those without.

None of the aforementioned patents disclose eutectic or other compositions together with physical forms thereof which are designed to take advantage of the actual process of dehydration of natural gas in a pressurized line. Although the basics of the operation of a gas dryer containing a charge of drying composition are known, the forms and compositions have not in the past made the most of the physical arrangement of the solid and liquid dessicants in the typical gas dryer, nor otherwise utilized the full advantage of the intimately mixed solid forms of my invention.

SUMMARY OF THE INVENTION

My invention is designed to utilize to the fullest advantage the physical arrangement of a dry bed positioned above (downstream of) a liquid drying section in a gas dryer having a gas inlet below (upstream) of the liquid drying section, together with a solid form of salts which are intimately mixed and formed by my unique process. Further, my invention overcomes the disadvantages of prior art solid drying tablets or pellets by achieving stronger and more intimately mixed solid forms. Unlike prior art solid forms, which were not intimately mixed and therefore were physically weak because of different crystal sizes, my solid forms are strong and, because of the intimate mixing, achieve an almost maximum eutectic effect.

My invention comprises in one aspect a "eutectic" composition in a particular physical/chemical form, and the method of making the physical/chemical form, and in another aspect the use of the eutectic form in a manner to efficiently remove moisture from a flowing gas.

My solid eutectic form is made as follows: (1) a combination of salts is chosen; the combination may be derived from the various synergistic combinations of salts discussed in the above cited Heath and Minger U.S. Pat. No. 2,143,008, which is fully incorporated herein by reference, or it may comprise other salts having dessicant abilities such as those mentioned in the other patents cited above, and wherein the combination has a synergistic vapor pressure effect similar to that discussed in the Heath and Minger patent. (2) A small amount of water and/or a glycol or similar polar solvent is added and (3) the mixture is heated to make a solution. After the solution is formed (it may be supersaturated in the form of a slurry, but I prefer a simple saturated solution), (4) the solution is poured into small molds such as ice cube trays or similar molds having smaller cavities and placed in a freezer. (5) After they are cooled and solidified, they are removed from the molds and placed in air-tight containers. It should be noted that no attempt is made to evaporate the water and/or the ethylene glycol although it is not essential that all of the solvent remain in the forms. Also it should be clear that the solution is poured into the molds when it is hot and that it may begin to solidify around 200° F., for example, because of its supersaturation.

Thus my gas dryer is a molded eutectic mixture of drying salts in a small amount of a polar solvent.

My invention is based on the observation that moisture from a gas contacting the individual pellets or molded forms of the eutectic will tend to form a solution on the surface of the pellet or form, fully coating the pellet or form before achieving enough volume to drip into a gas/liquid contactor below. The solution which forms below has in the past been generally more efficient at removing moisture than the solid material above. Therefore the aim of my invention is to effectively distribute such a solution throughout the entire bed of pellets or molded forms. Hence, my bed of pellets or molded forms is in effect a solid solution of the material rather than a dry form of it, and, because of the intimate mixture achieved by my method of preparation, maximizes the synergistic or eutectic effect of its components. By allowing for the creation of a film of liquid solution of the salts on the surface of the molded forms, my invention extends the capacity of the most efficient part of the unit. My invention will be described in more detail below.

My invention includes a method of drying natural gas comprising passing such natural gas through a bed of solid forms of a composition derived from lithium and calcium chlorides and bromides having the molar equivalents $$(Ca)_x(Li_2)_{(1-x)}(Br_2)_y(Cl_2)_{(1-y)}$$

where x and y are independently selected from numbers from 0 to 1, provided that if either x or y is less than 0.1 or more than 0.9, the other must be a number from 0.1 to 0.9. Preferably the gas is also passed through a solution of said salts. Particular preferred combinations of calcium, lithium, chloride, and bromide are described below.

DETAILED DESCRIPTION OF THE INVENTION

Figure 1:
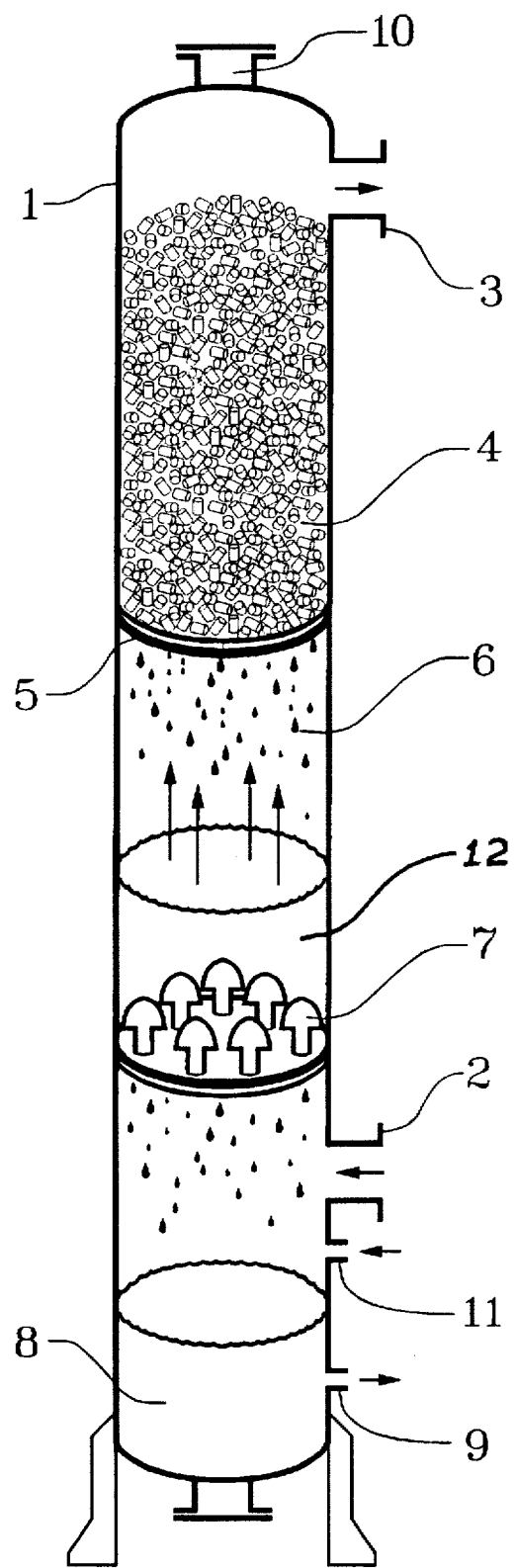
FIG. 1 depicts a gas dryer employing my molded drying forms.

My invention may employ any combination of drying salts which forms a vapor pressure eutectic, such as the calcium and lithium chlorides and bromides discussed in the aforementioned Heath and Minger patent. In particular, I employ mixtures of two or more of the salts $CaCl_2$, $CaBr_2$, $LiCl$, and $LiBr$, said mixtures having as overall ratios of molar equivalents $$(Ca)_x(Li_2)_{(1-x)}(Br_2)_y(Cl_2)_{(1-y)} \quad (I)$$

where x and y are independently selected from numbers from 0 to 1, provided that if either x or y is less than 0.1 or more than 0.9, the other must be a number from 0.1 to 0.9.

There are two formulations I have adopted as preferred compositions, one containing bromine and chlorine, and one containing only chlorine.

The preferred composition without bromine is the mixture of lithium and calcium chlorides at the point designated "G" in the figure of U.S. Pat. No. 2,143,008—that is, a mixture of lithium and calcium chlorides having $Li_2$ and Ca present in molar equivalents of 0.6 and 0.4. Minor amounts of polar solvent and defoamer are included, and the mixture is prepared and solidified as in the general procedure outlined below.

Thus this preferred composition may be expressed, based on the above general (I) formula where x=0.4 and y=0:

$$(Ca)_{0.4}(Li_2)_{0.6}(Cl_2)$$

which may be generalized to a preferred range of compositions:

$$(Ca)_x(Li_2)_{(1-x)}(Br_2)_y(Cl_2)_{1-y}$$

where x=0.2 to 0.6 and y=0 to 0.1

As a general procedure, an intimate mixture of the drying salts is made by assuring dissolution of the salts by heating the mixture to at least about 220° F., preferably to about 250° F. or otherwise to achieve a saturated solution; the mixture is then cooled to freeze the mixture, preferably at about 0° F. I have found that the strength of the tablet or molded form is improved if temperatures below the freezing point of the brine are used. The molded forms are removed from the molds and immediately placed in air-tight, preferably moisture-impermeable, containers for storage until they are put in use. The content of polar solvent or carrier should be from 5% to 25% by weight, preferably 10–20%. The polar solvent may be either water or a glycol but preferably comprises water and ethylene glycol in a ratio of 1:10 to 10:1. It may include other polar solvents or carriers such as propylene glycol, neopentyl glycol, other glycols, glycol ethers, sugars, and/or polyhydric alcohols. The glycols act as solvents to bring about intimate mixing without reducing the drying capacity as additional water would.

A second preferred mixture is represented by point "19" on the diagram of the Heath and Minger U.S. Pat. No. 2,143,008. This point represents a mixture of calcium and lithium chloride and bromide so as to provide lithium and calcium as 0.6 and 0.4 molar equivalents respectively, and chlorine and bromine in proportions of 0.2 and 0.8 molar equivalents respectively. This preferred composition may be expressed using the above general formula (I) where x=0.6 and y=0.8, which may be generalized to a preferred range:

$$(CA)_x(Li_2)_{(1-x)}(Br_2)_y(Cl_2)_{(1-y)}$$

where x=0.4 to 0.8 and y=0.5 to 1.0.

Persons skilled in the art will recognize that various combinations of lithium and calcium chlorides and bromides can be used to achieve the desired ratios of metal to metal and halide to halide for the above described second preferred composition.

In FIG. 1, the gas dryer construction is similar to prior art constructions; however, it contains my molded drying forms which are able to perform more efficiently in the gas dryer environment than prior art dryer compositions. The gas dryer comprises a generally cylindrical body 1 adapted to connect to a source of moisture-containing gas not shown through inlet 2 and to deliver relatively dry gas from an outlet 3. A major portion of the upper half of the body 1 contains a bed 4 of my eutectic drying forms on a perforated or wire screen support 5. The support 5 is constructed to permit both the upward passage of gas and the downward trickling of water or brine, represented by droplets 6. At a convenient distance above the inlet 2, a bubble cap tray 7 is placed to retard the further travel downward of liquid formed by droplets 6, so that a pool 12 of water or brine may function as the liquid drying section. A drain 9 is provided so the removed liquid 8 may be discarded or recycled, and a fill port 10 is located at the top of the body 1.

In operation, moisture-laden gas, typically containing of the order of 25–30 pounds of water per million standard cubic feet, enters inlet 2 and passes through bubble-cap tray 7 to encounter the pool 12 above it. Pool 12 is made from droplets 6 which are generally near saturation because the eutectic drying forms in the lower part of bed 4 slowly dissolve and accumulate water as they pick up moisture from the gas. Although pool 12 is initially made up primarily of water from droplets 6, and is therefore initially near saturation as are the droplets 6, the pool 12 acts to absorb moisture from the gas, and therefore the pool 12 is constantly being diluted by new moisture from the gas. Nevertheless, because of the eutectic mixture of salts in the bed 4 carried into the pool 12, the pool 12 is a very efficient dehumidifier for the gas passing through it. Accordingly, the upward moving gas in the space between pool 12 and tray 7 contains perhaps thirteen pounds of moisture per million standard cubic feet of gas. As indicated above, the water and/or other polar solvent content of the forms in the bed 4 mimics the concentrated eutectic solutions which are so efficient in removing moisture, and accordingly the lower part of bed 4 acts in a manner very similar to a pool, the surfaces of the eutectic forms constantly picking up moisture, forming a eutectic salt solution, and dripping into the pool 12. The uppermost region of bed 4 is the driest and quite efficient at removing moisture from the gas which has already been well dried. As the lower region of bed 4 dissolves and drips into pool 12, more solid forms can be added to the top of bed 4. Fluid level control port 11 controls the level of liquid 8.

Figure 2:
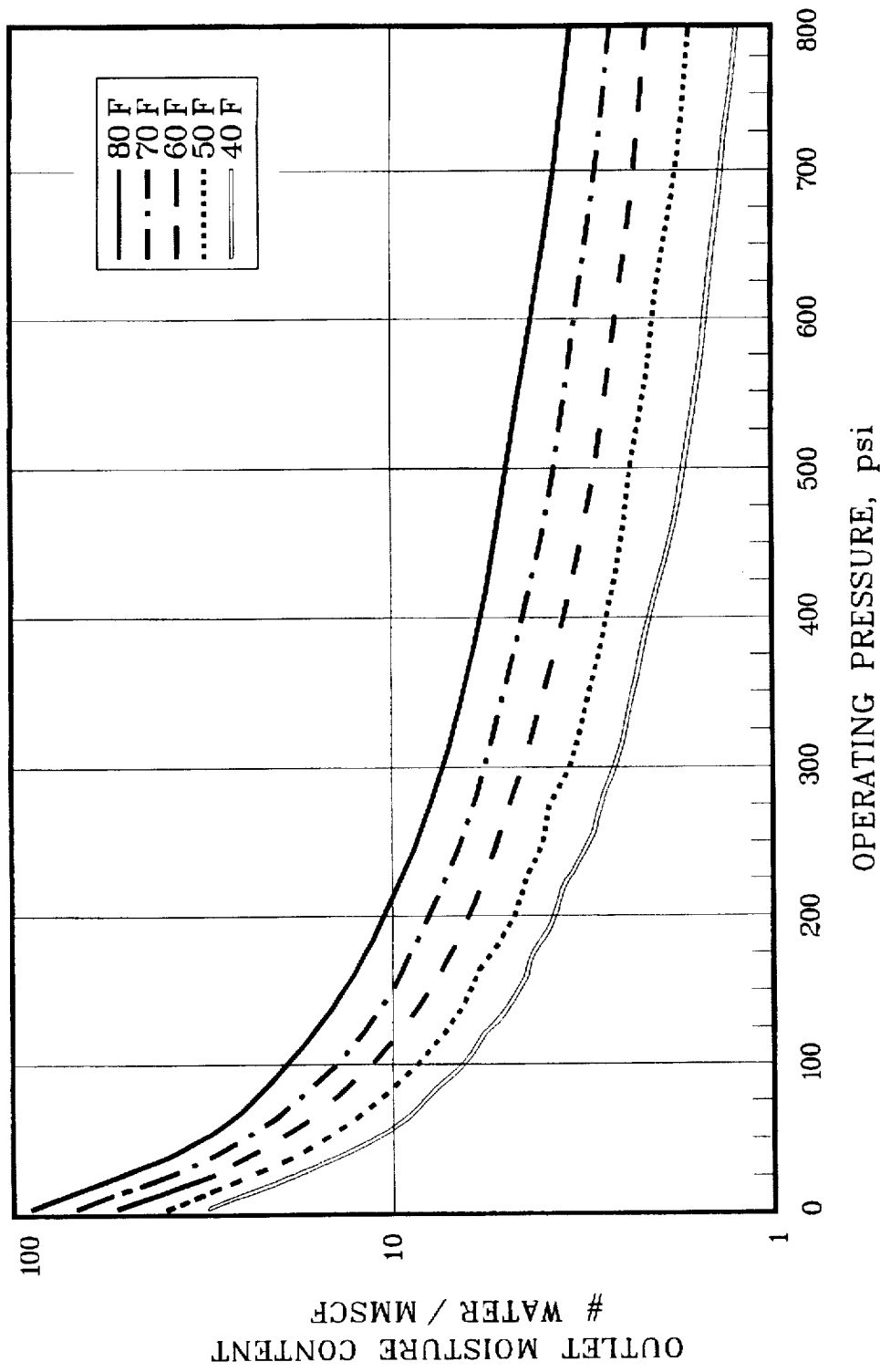
FIG. 2 is a graph showing the performance of my molded eutectic composition in a gas dryer similar to that of FIG. 1.

FIG. 2 plots the outlet moisture content of natural gas treated according to the first preferred composition of my invention against operating pressure at various temperatures. Natural gas was treated in a dryer similar to that of FIG. 1, using a charge of molded dryer composition made according to the procedure outlined above and containing the following ingredients:

| Ingredient | Percent by Weight |
| --- | --- |
| Calcium Chloride | 52 |
| Lithium Chloride | 28 |
| Ethylene Glycol | 8.75 |
| Defoamer ("Callaway 3377") | 2.5 |
| Water | 8.75 |

The curves were extrapolated from a number of points measured with a Miko Sunsprite ionization moisture analyzer. In addition to expressing this composition in terms of molar equivalents as above, variations of it may be expressed in terms of weight percent as calcium chloride about 45–60%, lithium chloride about 24–32%, and solvent about 15–20%, wherein the solvent may comprise water and ethylene glycol in ratios of about 2:1 to 1:2.

Figure 3:
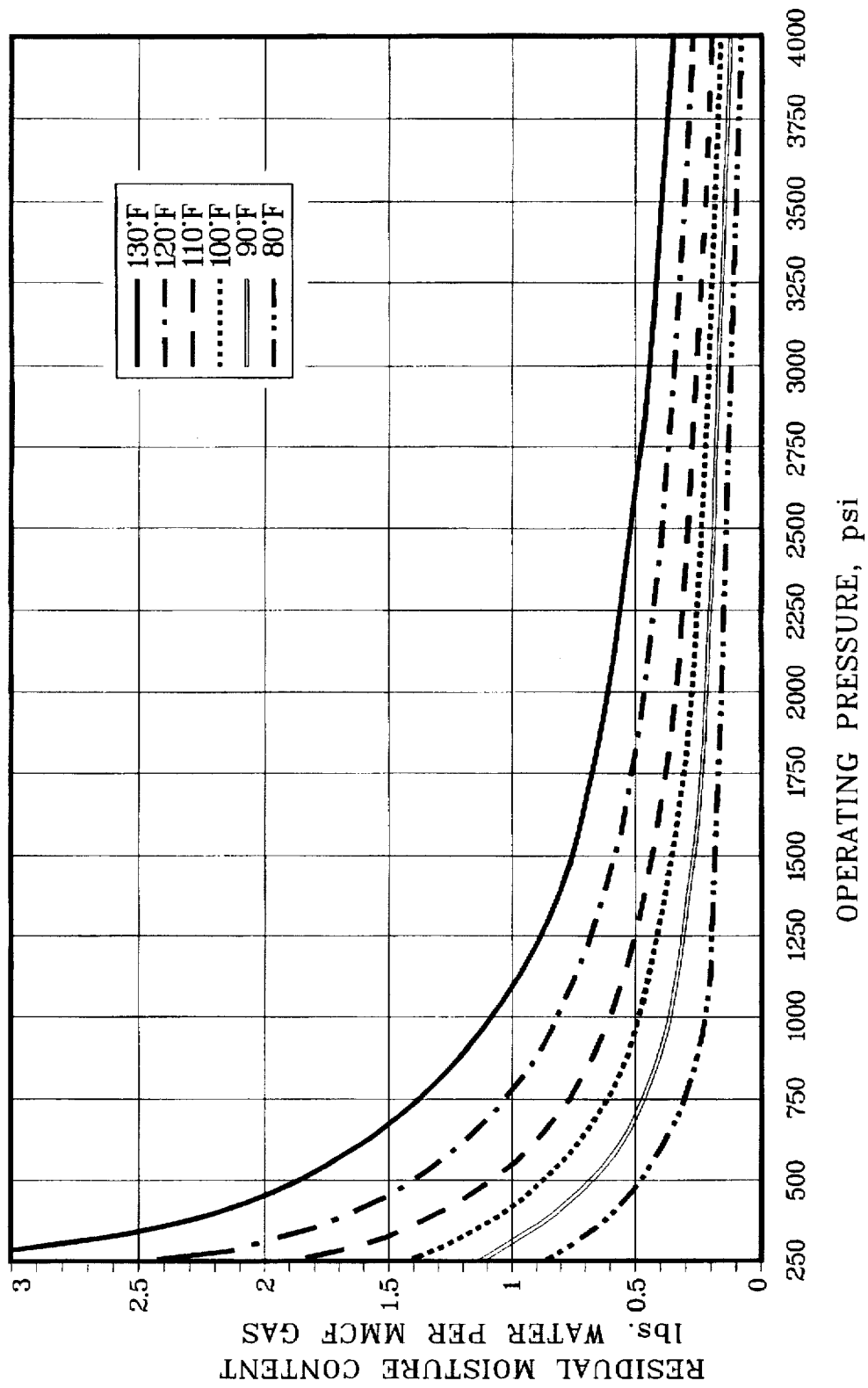
FIG. 3 is a graph showing the performance of a second preferred molded eutectic composition, also in such a gas dryer.

FIG. 3 plots the outlet moisture content of natural gas treated with my second preferred composition made according to the procedure outlined above, in a dryer of a design similar to FIG. 1. The solid molded forms about ⅛ inch in diameter and about ½ inch high contained the following ingredients:

| Ingredient | Percent by Weight |
| --- | --- |
| Ethylene Glycol | 10.5 |
| 54% aqueous LiBr solution | 22 |
| Lithium Chloride | 7.9 |
| Calcium Bromide | 59.6 |

Curves in FIG. 3 were also drawn from a number of points measured with a Miko Sunsprite ionization moisture analyzer. This second preferred composition may also be expressed in terms of weight percent as about 50–65% calcium bromide, about 8–15% lithium bromide, about 6–10% lithium chloride, and the balance water, ethylene glycol, or mixtures thereof, preferably in ratios of 2:1 to 1:2.

It will be seen from FIGS. 2 and 3 that my invention is quite effective at removing moisture from natural gas, particularly at higher pressures, in a dryer of the type which utilizes the solid as well as the liquid eutectic.

EXAMPLE 1

The operators of a gas drying tower in Pennsylvania were faced with a specification for gas of a maximum of seven pounds of moisture per million standard cubic feet. A commercial two-stage drying system using a liquid dessicant similar to that disclosed by Heath and Minger in U.S. Pat. No. 2,143,008 was unable to reach this specification in the tower. The dessicant was replaced with molded forms of the first preferred composition mentioned above and utilized in a dryer similar to FIG. 1; a moisture content of six pounds per million standard cubic feet was achieved.

I claim:

1. Method of making a solid gas drying form comprising mixing drying salts together with a small amount of polar solvent to make a mixture, heating said mixture to form a saturated solution of salts, and thereafter cooling, freezing and forming said mixture as a frozen mass.

2. Method of claim 1 wherein said drying salts comprise two or more of the salts lithium chloride, calcium chloride, lithium bromide and calcium bromide.

3. Method of claim 2 wherein said drying salts have, as molar equivalents, the relationship

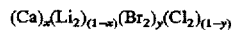

where x and y are independently selected from numbers from 0 to 1, provided that if either x or y is less than 0.1 or more than 0.9, the other must be a number from 0.1 to 0.9.

4. Method of claim 1 wherein said polar solvent comprises water and ethylene glycol.

5. Method of claim 3 wherein x is a number from 0.2 to 0.6 and y is a number from 0 to 0.1.

6. Method of claim 3 wherein x is a number from 0.4 to 0.8 and y is a number from 0.5 to 1.0.

7. Method of claim 1 wherein said forming takes place in a mold.

8. Method of claim 1 followed by placing said frozen mass in an airtight container.

9. A solid gas-drying composition comprising an intimate mixture of about 45% to about 60% by weight calcium chloride, about 24% to about 32% by weight lithium chloride, and about 15% to about 20% of a polar solvent comprising water and ethylene glycol in a ratio from about 2:1 to about 1:2, said intimate mixture being made by freezing a saturated solution of said calcium chloride and said lithium chloride in said polar solvent.

10. A solid gas-drying composition comprising an intimate mixture of about 50–65% by weight calcium bromide, about 8–15% lithium bromide, about 6–10% lithium chloride, and about 15% to about 25% polar solvent comprising water and ethylene glycol in a ratio from about 2:1 to about 1:2, said intimate mixture being made by freezing a saturated solution of said calcium bromide, said lithium bromide and said lithium chloride in said polar solvent.

11. A molded solid gas drying form made by placing a mixture of drying salts having a vapor pressure eutectic together with a polar solvent at a temperature elevated sufficiently to form a saturated eutectic solution of said drying salts, placing said solution in a mold, and freezing said solution.

12. A gas drying form of claim 11 wherein said salts are selected from calcium and lithium bromides and chlorides.

13. A gas drying form of claim 11 wherein said elevated temperature is about 220° F.

* * * * *